United States Patent Office 3,261,170
Patented July 19, 1966

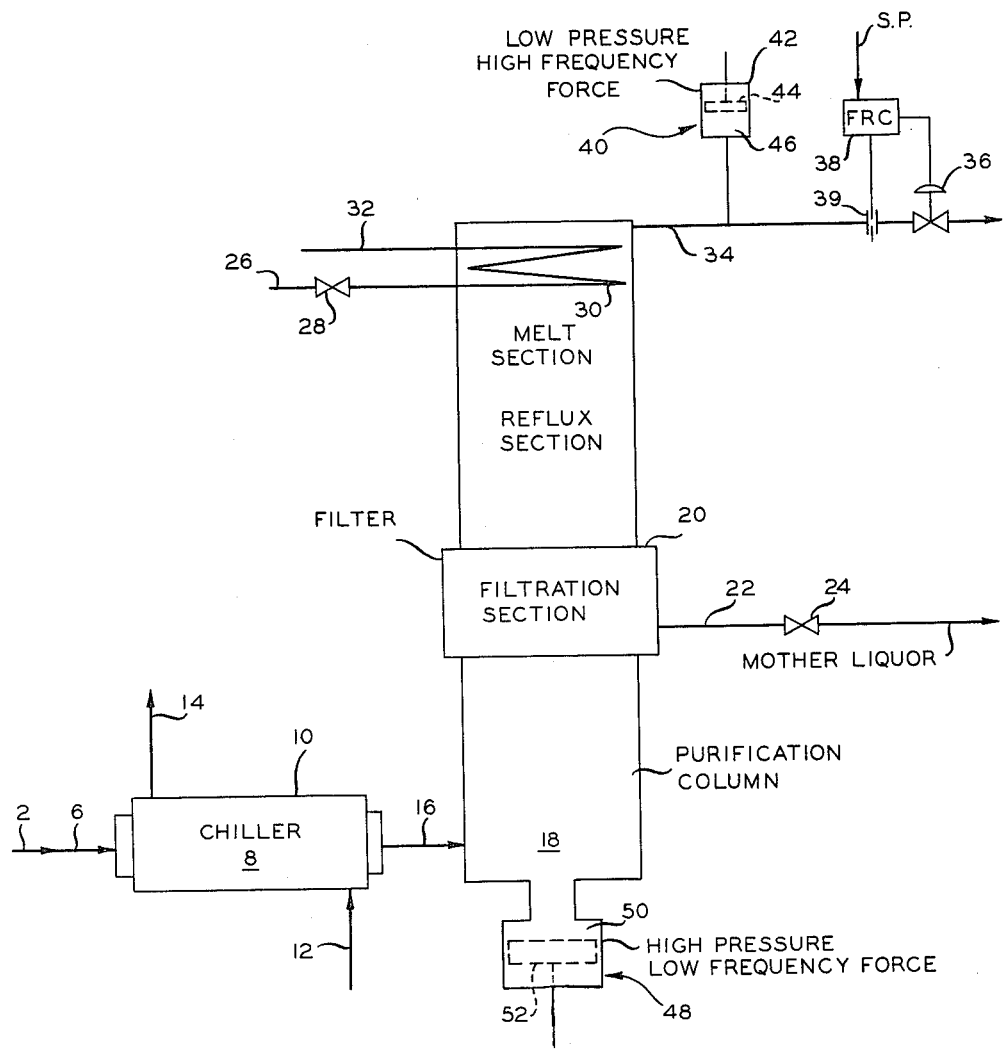

3,261,170
MULTI-STAGE CRYSTALLIZATION PROCESS
AND APPARATUS
William C. McCarthy and Glenn H. Dale, Bartlesville,
Okla., assignors to Phillips Petroleum Company, a corporation of Delaware
Filed May 10, 1963, Ser. No. 279,543
7 Claims. (Cl. 62—58)

This invention relates to the separation of mixtures of compounds by crystallization. In one aspect, the invention relates to the multi-stage crystallization of mixtures of compounds. In another aspect, it relates to the purification of compounds by crystallization.

Purification by means of fractional crystallization has been known for a number of years. Schmidt Re. 23,810 (1954) discloses a process and apparatus for purifying crystals involving moving the mixture of crystals and adhered liquid through a liquid removal zone, a reflux zone and a melting zone, removing liquid in said liquid removal zone, melting crystals in said melting zone, withdrawing part of the melt as product and forcing part of the melt in a direction countercurrent to the movement of crystals in said reflux zone.

U.S. Patent No. 2,854,494 (1958) issued to Rosswell W. Thomas provides method and apparatus wherein the melt is withdrawn in part as purified product and forced in part into the reflux zone toward a filter and a pulsating back pressure is applied to the contents of the purification chamber by means of a reciprocating piston positioned in a cylinder which is in open communication with the chamber at the end in which the heating means is positioned. The back pressure is sufficient to produce a counterflow of liquid relative to the movement of the crystals. Thus, when the solids are supplied steadily during a given period of time to the purification zone, the reflux or other purifying liquid is moved intermittently in the opposite direction, that is, countercurrently with respect to the solids. This process is generally applicable to the separation of at least one pure component from any mixture which forms the eutectic type solid-liquid phase equilibria. For example, the process can be used for the concentration of fruit juices, vegetable juices, alcoholic beverages, and other materials which comprise aqueous solutions which can be concentrated by the formation and removal of ice crystals. The process is also of great value in the resolution of non-aqueous mixtures. An example of such an application is the separation of paraxylene from a mixture thereof with other xylene isomers and ethyl benzene.

When the components of a mixture form solid solutions, it is not possible either theoretically or actually to obtain a pure material by one stage of crystallization, i.e., by a single freezing step followed by a crystal-liquor separation step. In such cases pure crystals of a single component do not separate from the feed. The material so crystallized is a mixture of the components present, the ratio depending on the composition of the starting material and on the equilibrium characteristics for the particular system. The crystals will be richer with respect to the higher melting component of the mixture than the liquid from which those crystals were solidified. If equilibrium between the crystals separated from a mixture of solid solution forming components in the remaining liquid could easily be obtained, then separation of the components could be obtained by moving the crystals countercurrently to a liquid which becomes increasingly richer with respect to that component tending to be preferentially removed by freezing. The crystals reaching the end would be substantially pure. At least a portion of the crystals would be melted and the melt returned countercurrently to the moving crystals where the remaining crystals would be removed as product. At the opposite end of such a crystallizer, cooling could be applied to generate the crystals, the unfrozen liquid would be removed as a pure, less easily frozen fraction of the original mixtures. The crystals formed would always be moved toward the warmer end of the crystallizer. While such a process is theoretically possible, its efficiency is disappointingly low. This is due to the length of time required for the solid and remaining liquid to reach equilibrium. Resort to alternate partial or complete melting and freezing is usually the result of attempts to obtain purer products by countercurrent continuous crystallization. In such a process, the energy requirements and amount of heat transfer required are inordinately large because the heat of crystallization must be added and removed many times throughout the process.

This invention represents an improvement over the patent to R. W. Thomas, U.S. 2,854,494, and provides a method and apparatus for the improved purification of crystals, particularly a multi-stage crystallization process and apparatus.

It is an object of the invention to provide a method and apparatus for the separation of mixtures of compounds by crystallization.

It is another object of the invention to provide a method and apparatus for the multi-stage crystallization of mixtures of compounds.

It is another object of the invention to provide a method and apparatus for the separation of solid solution-forming mixtures into its components.

It is another object of the invention to provide a method and apparatus for the separating of eutectic-forming mixtures into their components.

It is another object of the invention to provide an improved method and apparatus for the movement of a bed of crystals through a purification column.

These and other objects of the invention will be readily apparent to those skilled in the art from the following description, drawings and disclosure.

These objects are broadly accomplished in a process for separating a mixture of compounds into high-purity higher melting and lower melting fractions by maintaining an elongated, confined body of the mixture to be separated, maintaining a temperature differential between the ends of said body, maintaining within said body a temperature such that a portion of said mixture can be made to solidify by the application of pressure to said body, subjecting said body to a first pulsating pressure to cause portions of said mixture to solidify and portions of said solid to melt, moving the solids so formed towards the warmer end of said body, subjecting the warmer end of said body to a second pulsating pressure, thereby forcing the liquid countercurrent to said solids and toward the colder end of said body, withdrawing a higher melting fraction of said fraction from said warmer end of said body, and withdrawing a lower melting fraction of said mixture from said colder end.

In one embodiment of the invention, said first pulsating pressure is at a relatively low frequency and high pressure so as to alternately solidify and melt portions of the mixture to accelerate the approach toward equilibrium between the solid and liquid phases and the second pulsating pressure is of a higher frequency and lower pressure than said first pulsating pressure and forces part of the melt countercurrently to the reflux zone to establish a reflux stream in the form of a pulsating stream against the crystals.

The invention is best illustrated by the drawing which is an elevational view of a preferred modification of the chiller and purification column.

A feed mixture comprising two or more components, one of which is separable from a mixture by crystallization, enters the system through feed inlet 2. A pump, not shown, may be provided to force the mixture into the chilling section. The chiller may be cooled by any suitable means such as a jacket 10 through which a heat exchange medium is passed through conduits 12 and 14. Conditions are maintained in the chiller to form a slurry of crystals and mother liquor, said slurry then being passed through conduit 16 into the purification column 18.

The chiller also generally contains (not shown) an agitating or scraping means which is designed to prevent the accumulation of solid material on the heat exchange surface. These are frequently fabricated in the form of a helix and any suitable number of scrapers can be provided.

The purification apparatus is preferably composed of a cylindrical shell closed at both ends and comprising in series an inlet section, a filtration section, a reflux section, a melt section, and a withdrawal section. The slurry upon leaving the inlet section of the purification column passes first through a filtration section comprising a suitable filter medium 20, the latter being provided with an outlet pipe 22 for the filtrate. The filter medium can be of any type known in the art. For example, it can comprise a metallic screen, a sintered perforate metal member, or a perforate metal member, supporting a filter cloth. Generally, it is desirable that the filter member 20 be positioned integrally with respect to the shell. The filtrate produced in the filter zone is removed through conduits 20 and 24 and comprises essentially all of the mother liquor. In some systems of the eutectic type, it may be desirable to recycle at least a portion of said mother liquor through conduit 2 back to the feed to the chiller. This is especially true when concentrating dilute aqueous systems such as beer.

The remaining crystal mass passes through the reflux section wherein it is countercurrently contacted with the liquid reflux produced as subsequently described.

As the crystal mass approaches heater 30 in the melt section, the crystals are melted. The heater 30 can be in the form of an electrical heater or a heat transfer coil through which a suitably heated fluid is pumped through conduits 26, valve 28 and heat exchange surface 30 and conduit 32. Part of the melt produced by heater 30 is withdrawn through the outlet pipe 34 as a purified product of the process. The remainder of the melt is forced back through the reflux zone to form reflux which affects crystal purification, the resulting liquid being drawn out through outlet 22. Although an internal heater 30 is shown, an external heater can be used, for example, a heating jacket encompassing the melt section and provided with means for circulating heating fluid therethrough. In addition, it is also possible to remove a portion of the crystals and melt them externally of the purification column and then return the melt back to the purification column for reflux.

In order to provide back pressure in the purification column so as to restrain flow therethrough and produce a constant product rate, a flow sensing means 39 determines the flow in the conduit 34 and transmits a signal to a pressure recorder controller 38 which, in turn, actuates valve 36 so as to control the flow of product therethrough.

A low pressure, high frequency force is maintained on the melt by any suitable means such as a pulsating producing member 40 comprising a cylinder 42, a chamber 46 and a piston 44, said piston being reciprocated by any suitable means such as by connection to an electrical motor through suitable valve, crank means, connecting rods, etc. While the crystal mass is being advanced from the chilling section 8 through the filtration section, reflux section and melting section, the piston 44 is reciprocated at a suitable rate, which is subsequently discussed herein, so that a pulsating pressure is exerted on the melt reflux so that it is intermittently forced back countercurrently with respect to the crystal mass through the reflux zone. Any suitable means may be provided for producing an intermittent pressure at a relatively high frequency on the melt. It has been found that certain ranges of frequency of pulsation of the back pressure applied produces superior results to certain other ranges of frequency. For example, in the separation of para-xylene from its isomers, improved results are obtained when the frequency is in the range of 100 pulsations per minute to as high as 400 pulsations per minute. However, outstanding results are obtained at 200 to 300 pulsations per minute. This applied pressure on the melt is relatively low pressure, generally in the range of 10 to 500 p.s.i.a., preferably 50 to 300 p.s.i.a., at the above frequency.

It has been previously explained that phase equilibrium between crystal material and liquid containing the same components is not readily attained. It has now been found that it is possible to hasten the attainment of equilibrium and thus effect multi-stage separations, for example, on solid solution systems, by the simultaneous application of a high pressure, low frequency force to said crystal mass within the purification column at the same time that the above low pressure, high frequency force is applied.

In one embodiment this high pressure, low frequency force is applied at the end of the purification column opposite the end where the low pressure, high frequency force is applied and may be accomplished by any suitable means, such as a pulsation producing means 48 comprising a chamber 50 and a piston 52 actuated by any suitable means such as an electric motor.

The high pressure, low frequency force will be superimposed on the low pressure, high frequency force. Preferably the pressure is in the range of 1000 to 5000, more preferably 1500 to 3000, p.s.i.a. and the frequency is preferably in the range of 1 cycle per 10 seconds to 1 cycle per five minutes, preferably 1 cycle per minute to 1 cycle per 2 minutes.

Although this invention is primarily applicable to the separation of solid solution systems or those systems which do not form eutectic mixtures, the invention is also applicable to eutectic mixtures.

The operation of the process is possible because of the phenomenon that is described by Le Chatelier's law which states that if a stress is brought to bear upon a system in equilibrium, the equilibrium should be shifted in a direction that will tend to relieve the stress. Another phenomenon which makes possible the operation is the fact that the volume occupied by a solid is not the same as the vloume occupied by an equal weight of the same material in liquid phase. With certain exceptions, notably water, the volume occupied by a given weight of a chemical compound is greater for the liquid phase than for the solid phase. This means that if a given solid and its mother liquor are in phase equilibrium the application of pressure to the system will tend to cause the formation of an additional amount of solid. If the pressure is reduced, a portion of the solid will melt to increase the amount of liquid. If the solid and liquid phases are in equilibrium, increasing the pressure and afterward reducing it to the initial value will not result in any change in the amount of solid or the composition of the solid. However, if the solid and liquid are not in equilibrium, increasing the pressure and afterwards reducing it to the initial value will result in a final solid and liquid which are more nearly in equilibrium than were the original phases. By repeating the pressure fluctuation steps a sufficient number of times, the solid and liquid would obtain perfect equilibrium. By increasing the pressure to bring about crystal formation and reducing the pressure to melt the crystals, a multi-stage crystallization process can be brought about without the addition and subtraction of heat as is required in the usual crystallization process.

The rate of pressure pulsation, that is, the high pressure, low frequency pulsation within a crystallizer and the speed of crystal transfer through the crystallizer are, of course, dependent upon the particular system involved. Each pulsation represents a freezing and melting stage and the number of such stages required is, of course, dependent upon the amount of separation obtained in each stage. The product removal can be continuous or the removal can be synchronized with the pulsations. In the latter instance, it is preferable to open the outlet at the period of lowest pressure. This makes the operation simpler.

The invention is particularly adapted to separating the components of solid solution-forming mixtures which theoretically require a plurality of freezing and melting stages. For mixtures which do not form solid solutions, the process rapidly frees the crystals of any occluded or trapped mother liquor. During the melting part of the cycle, the smallest and most needle-like crystals are melted preferentially. During the freezing part, the largest crystals will grow preferentially. Thus, the crystalline mass that causes entrapment of mother liquor is rapidly destroyed and the crystals are freed of the mother liquor. The invention can in general be used for any separation that can be accomplished by crystallization. The invention can also be applied to materials which form amorphous solids, including the purification of fats and oils, such as oleomargarine and other jelly-like materials.

The invention is also applicable to the separation of materials forming eutectic mixtures, such as described in U.S. Patent No. 2,854,494, and including the concentration of food products. In the preparation of such concentrated foods, the process consists generally of the removal of water in the form of ice crystals from such products. One class of foods which can be concentrated in this manner is that of fruit juices. Another class comprises beverages, such as milk, wine, beer, coffee, tea, and various liquors, as well as the concentration of vegetable juices.

The high pressure, low frequency force may be applied at any point on the crystal mass within the purification column including the same end as the low pressure, high frequency force.

Although the purification chamber is shown positioned vertically, it can be operated in other positions, for example, it can be maintained in a horizontal position.

As an example of the applicability of the invention in the separation of cyclohexane from methylcyclopentane in apparatus of the type shown in the drawing, the high pressure, low frequency cycle is maintained on 30 seconds and off for 30 seconds. The low pressure, high frequency cycle is maintained at 300 cycles per minute at a pressure of 100 p.s.i.g. The improvement over a system not employing the combination of pulses is evident from the number of stages effected as shown in the following table.

TABLE

| Run No. | Maximum Pressure, p.s.i.g. | Feed Rate, g.p.h. | Cyclohexane Composition, Wt. Percent | | | No. of Stages |
|---|---|---|---|---|---|---|
| | | | Feed | LMP | HMP | |
| 1 | 1,700 | 0.28 | 84.3 | 84.0 | 95.0 | 2.4 |
| 2 | 0 | 0.45 | 84.3 | 86.5 | 88.4 | 0.4 |
| 3 | 1,700 | 0.41 | 84.3 | 77.8 | 93.5 | 3.1 |

While certain examples, structures, compositions and process steps have been described for purposes of illustration, the invention is not limited to these. Variation and modification within the scope of the disclosure and the claims can readily be effected by those skilled in the art.

We claim:

1. The method of separating a mixture of liquefiable compounds into higher melting and lower melting fractions which comprises the steps of maintaining an elongated, confined body of the mixture of liquefiable compounds to be separated, maintaining a temperature differential between the ends of said body, maintaining within said body a temperature such that a portion of said mixture can be made to solidify by the application of pressure to said body, subjecting said body to a first pulsating pressure to cause portions of said mixture to solidify and portions of the solidified mixture to melt, moving the remaining solid so formed towards the warmer end of said body, subjecting the warmer end of said body to a second pulsating pressure thereby forcing liquid at the warmer end of said body countercurrent to said solidified mixture and toward the cooler end of said body thereby establishing a reflux in the form of a pulsating stream of liquid against the body, withdrawing a higher melting fraction of said mixture of liquefiable compounds from the warmer end of said body, and withdrawing a lower melting fraction of said mixture of liquefiable compounds from said cooler end.

2. The method of separating a binary mixture whose components are liquefiable and substantially completely miscible in the liquid and solid phases, which comprises the steps of maintaining a confined, elongated body of the mixture of liquefiable components, maintaining one end of said body at a temperature below the melting point of the higher melting component of said mixture but above the melting point of the material of said mixture having less than a predetermined content of said higher melting component, maintaining the opposite end of said body at such a temperature that the lower melting component of said mixture of less than a predetermined purity with respect to said lower melting component will be solid but material having said purity will be liquid, subjecting said body to a first pulsating pressure that causes portions of said liquefiable mixture to solidify and a portion of solidified mixture to melt, moving the solids so formed towards the warmer end of said body, subjecting the warmer end of said body to a second pulsating pressure thereby forcing liquid at the warmer end of said body countercurrent to said solids and towards the colder end of said body thereby establishing a reflux in the form of a pulsating stream of melt against the body, withdrawing a higher melting fraction of said liquefiable mixture from the warmer end of said body, and withdrawing a lower melting fraction of said liquefiable mixture from said cooler end.

3. A method for separating a mixture of liquefiable compounds comprising subjecting said mixture of liquefiable compounds to conditions sufficient to crystallize at least a portion thereof, introducing the resultant crystals into a confined zone, moving said crystals through a reflux zone and a melt zone in which said crystals are melted, part of the melt being withdrawn from the system and the remainder being forced countercurrently into said reflux zone to establish a reflux stream, subjecting said reflux to a first pulsating pressure thereby forcing said reflux into said reflux zone in the form of a pulsating stream against said melt, and simultaneously subjecting the confined body of solid-liquid mixture to a second pulsating pressure to alternately solidify and melt portions of the mixture to accelerate the approach toward equilibruim between the solid and liquid phases.

4. The process of claim 3 wherein said first pulsating pressure has a high frequency and a low pressure and said second pulsating pressure has a relatively low frequency and a relatively high pressure.

5. The process of claim 3 wherein said first pulsating pressure has a frequency in the range of 100 to 400 pulsations per minute and a pressure in the range of 10 to 500 p.s.i.a.

6. The process of claim 3 wherein said second pulsating pressure has a frequency in the range of 1 cycle per 10 seconds to 1 cycle per 5 minutes and a pressure in the range of 1000 to 5000 p.s.i.a.

7. Apparatus for the separation of a mixture of compounds comprising a cooling chamber, means for cooling said chamber, an inlet and outlet conduit to said cooling chamber, said outlet conduit being in communication with a crystal purification chamber, a heating means in the end of said purification chamber opposite said above outlet conduit, a first withdrawal conduit in said opposite end portion of said purification column, a second withdrawal conduit in communication with said purification column intermediate said outlet conduit and said opposite end, a first pulsation producing means positioned in said first withdrawal conduit and a second pulsation producing means positioned in the end portion of said purification column adjacent said outlet conduit.

References Cited by the Examiner

UNITED STATES PATENTS

| | | | |
|---|---|---|---|
| 2,854,494 | 9/1958 | Thomas | 260—674 |
| 3,119,771 | 1/1964 | Cottle | 210—59 |
| 3,170,870 | 2/1965 | Bachman | 210—59 |

MORRIS O. WOLK, *Primary Examiner.*

E. G. WHITBY, *Assistant Examiner.*